March 3, 1931. A. KIRCHHOFER 1,794,521
BOOK COVER MAKING MACHINE
Filed Jan. 16, 1929 5 Sheets-Sheet 1
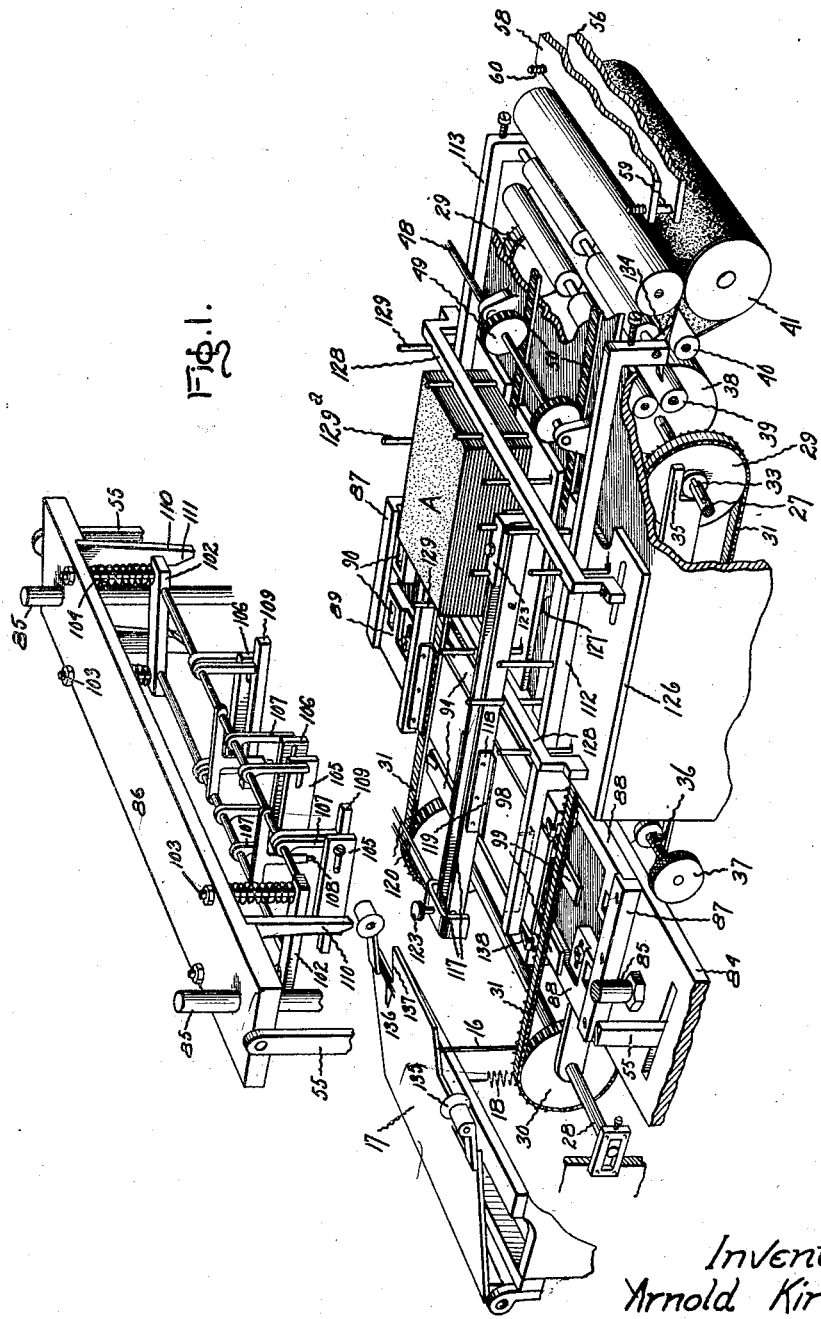
Inventor:
Arnold Kirchhofer,
by Alfred V. Baker
His Attorney.

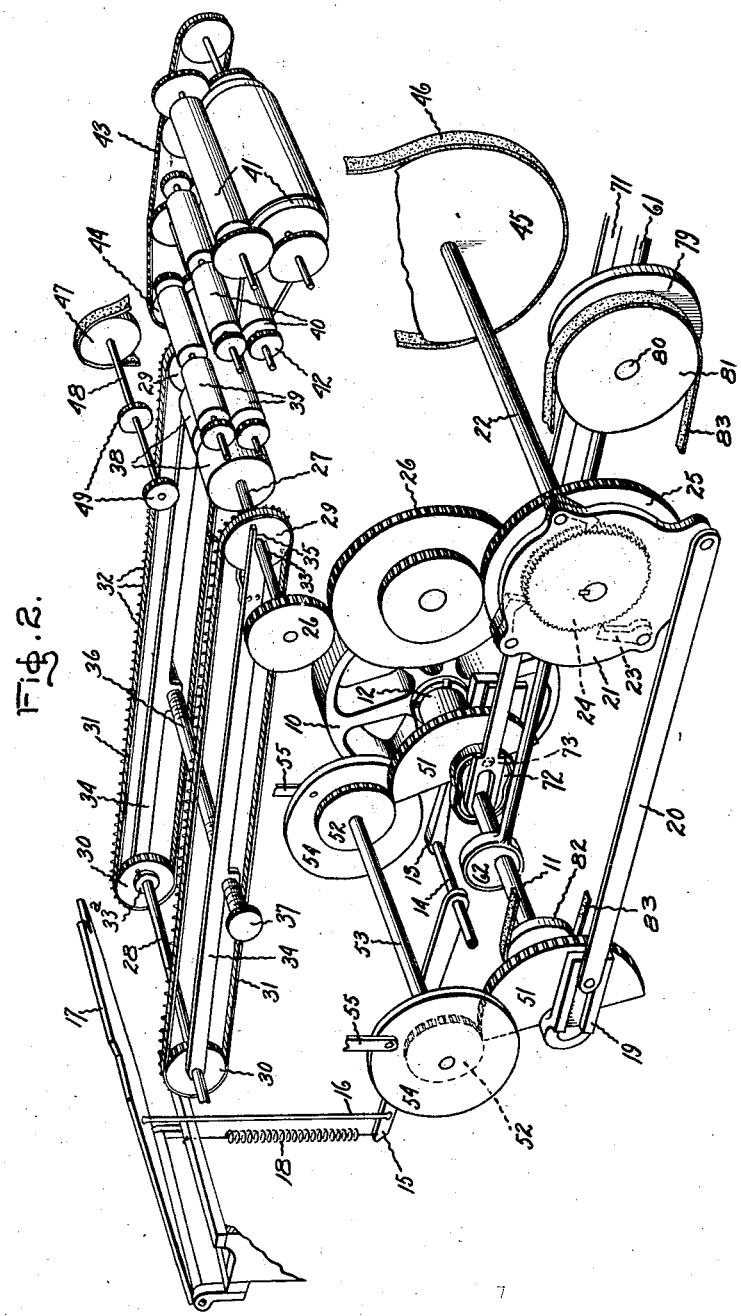

March 3, 1931. A. KIRCHHOFER 1,794,521
BOOK COVER MAKING MACHINE
Filed Jan. 16, 1929 5 Sheets-Sheet 3
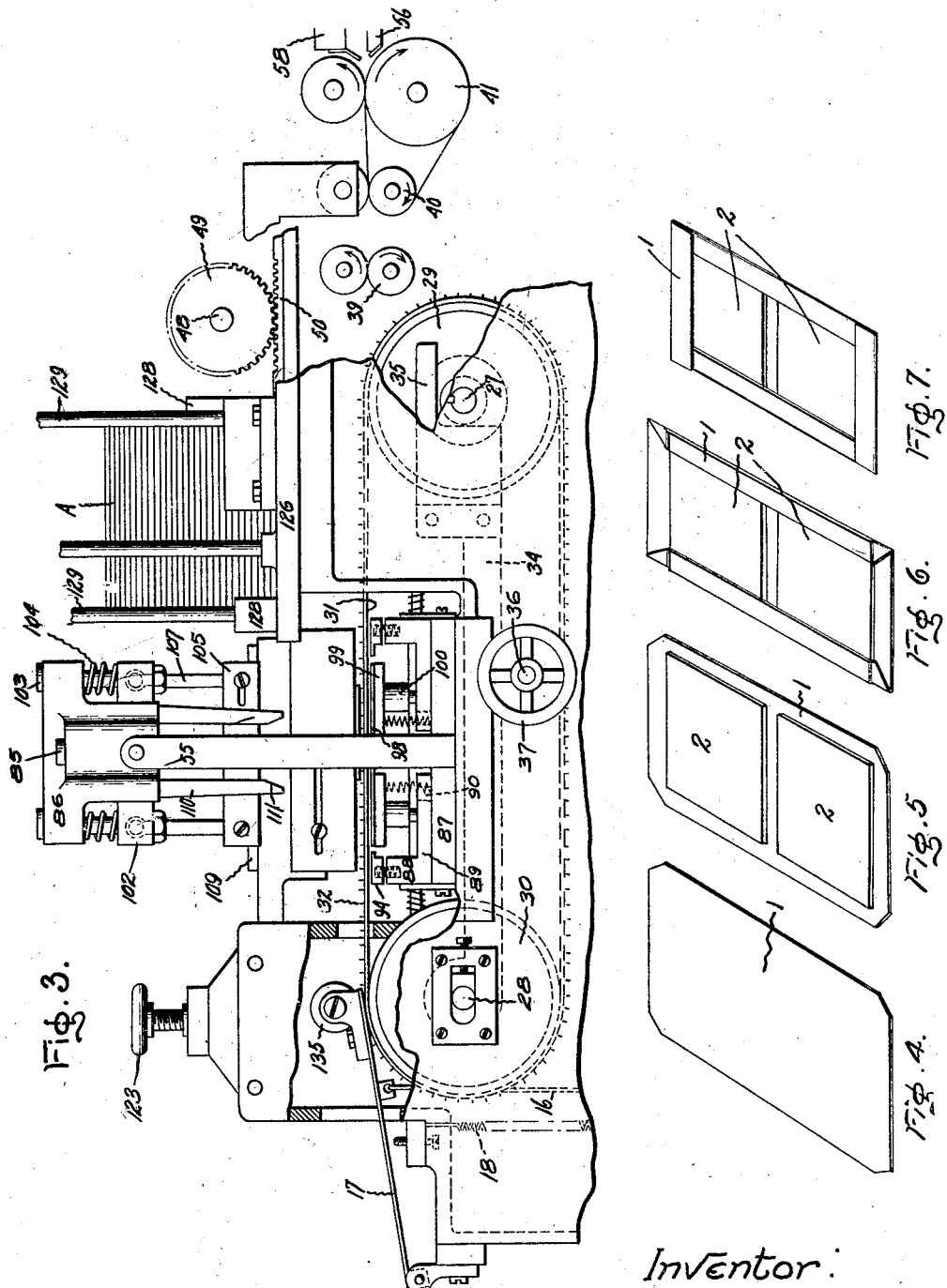
Inventor:
Arnold Kirchhofer,
by Alfred V. Buber
His Attorney.

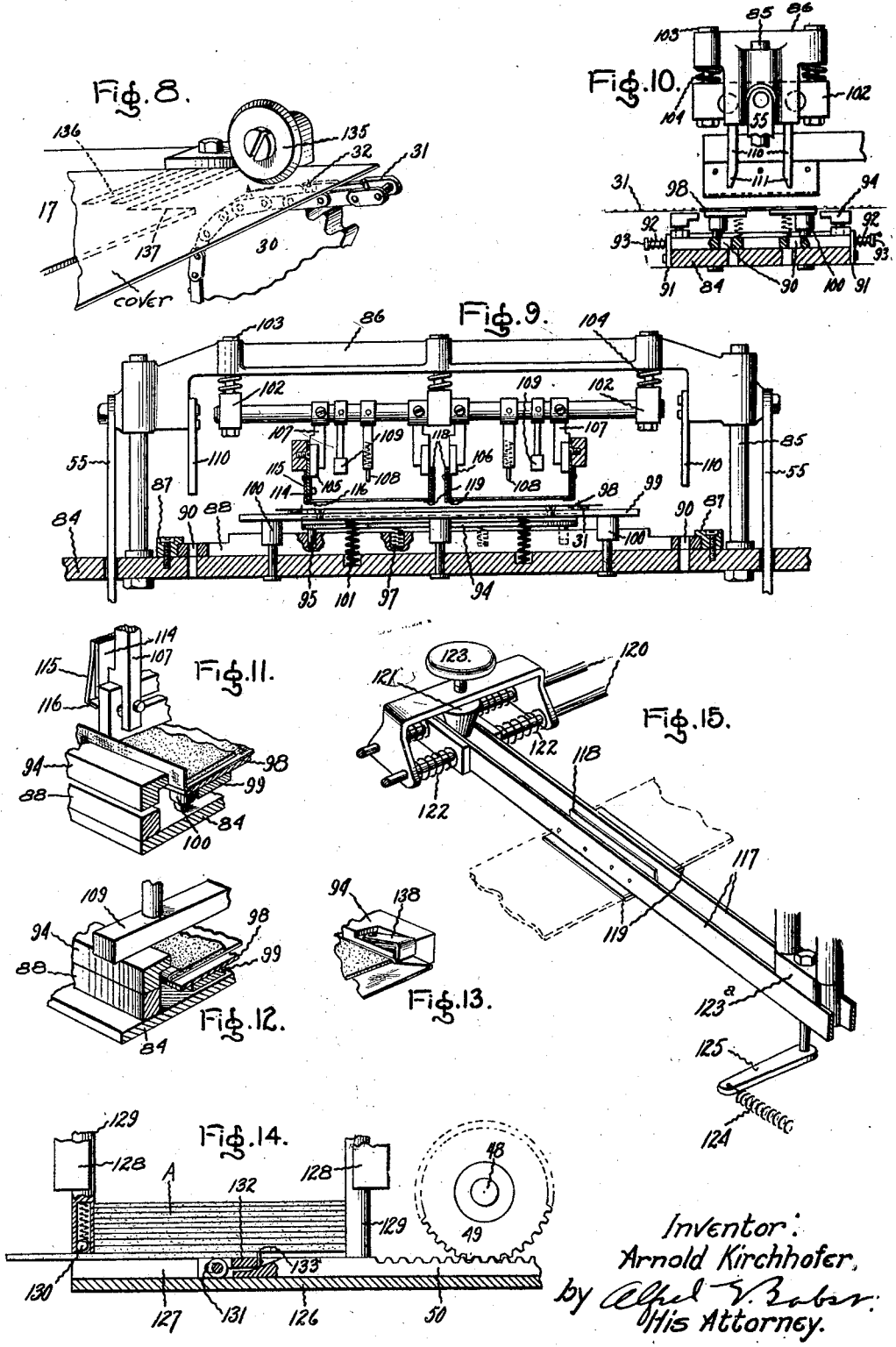

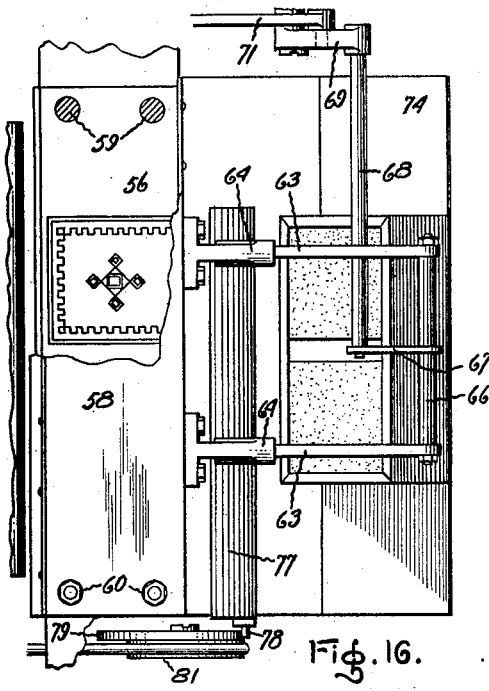
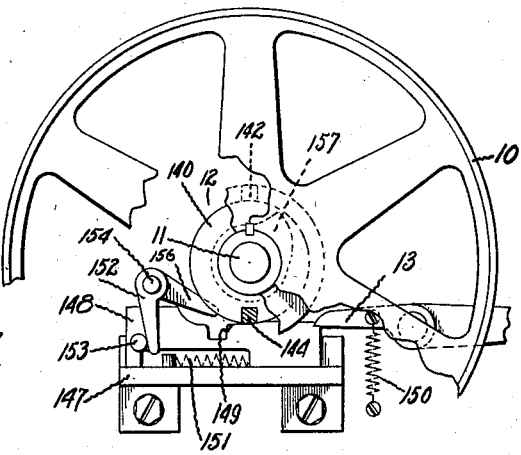
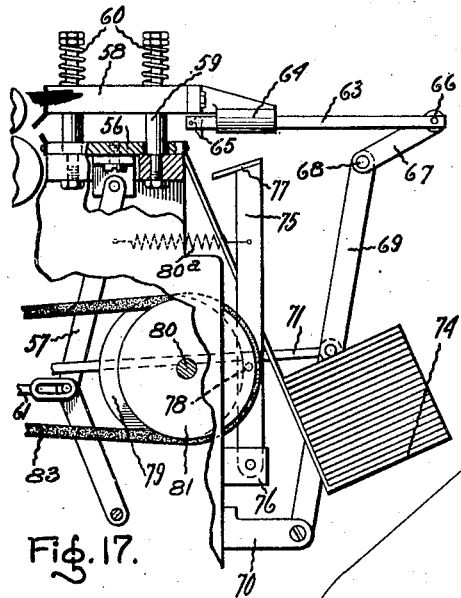
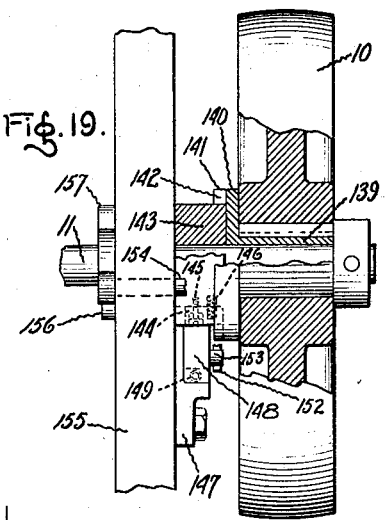
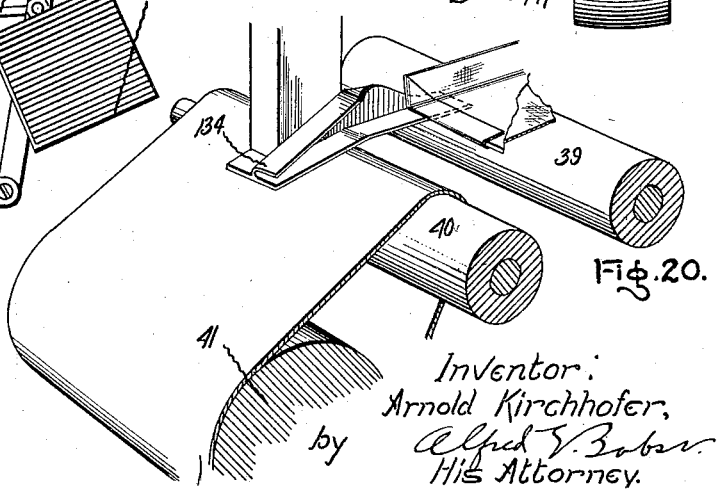

Patented Mar. 3, 1931

1,794,521

UNITED STATES PATENT OFFICE

ARNOLD KIRCHHOFER, OF HUDSON, NEW YORK

BOOK-COVER-MAKING MACHINE

Application filed January 16, 1929. Serial No. 332,821.

The present invention relates to book cover making machines and has for its object to provide an improved machine of this type. For a consideration of what I believe to be novel and my invention attention is directed to the following specification and the claims appended thereto.

In the drawing, Fig. 1 is a perspective view, partly diagrammatic and partly broken away, of the upper portion of the machine, a part of the machine being raised up to show the parts beneath it; Fig. 2 is a skeleton view of the drive for the machine; Fig. 3 is a side view, partly broken away and partly diagrammatic; Figs. 4 to 7 are views showing the steps used in forming a cover; Fig. 8 is a detail perspective view of the paper feed; Fig. 9 is a transverse sectional view of the side folding and pressing mechanism; Fig. 10 is an end view of the portion of the machine shown in Fig. 9; Figs. 11, 12 and 13 are detail perspective views of the side folding mechanism; Fig. 14 is a detail sectional view of the board feeding mechanism; Fig. 15 is a detail perspective view of the center gage strips and the adjusting means therefor; Fig. 16 is a top plan view and Fig. 17 is a side view of the final pressing mechanism and the stacking mechanism; Figs. 18 and 19 are detail views of the driving clutch mechanism, and Fig. 20 is a perspective view of the end folding means.

A book cover as constructed by the machine comprises three pieces, a cover sheet 1, (see Figs. 4 to 7) and two cover boards 2. The cover sheet may be cloth, paper or other suitable material. The cover boards may comprise a suitable grade of cardboard. Fig. 7 shows a completed cover, the two cover boards being glued to the cover sheet and the edges of the cover sheet being turned in over the edges of the cover boards.

The machine will be understood best by describing first the series of steps performed by it. In the first instance a cover sheet glued on its upper side is fed into the machine by an endless conveyor or carrier and at the same time two cardboards are pushed from beneath two stacks of card boards and positioned on holders over the cover sheet. The movement of the carrier then ceases and next a presser mechanism presses the cover boards down onto the cover sheet to a position between two side folding members. The side folding members are then moved toward each other to fold the longitudinal edges of the cover sheet over the cover boards and press them down tightly (see Fig. 6). The presser mechanism then releases and the cover sheet and cover boards are fed forward again between sets of rollers. In connection with one set of rollers is a folding mechanism which turns the two ends of the cover sheet over the end edges of the cover boards as shown in Fig. 7. Following this the cover structure is given a final pressing operation and is ejected from the machine onto a stacker.

Referring first to Fig. 2 which shows diagrammatically and in skeleton form the general driving arrangement, 10 indicates a driving pulley which turns continuously and is loosely mounted on a main drive shaft 11. Pulley 10 is adapted to be connected to drive shaft 11 by a clutch structure 12 shown in detail in Figs. 18 and 19. Clutch structure 12 is held open normally by a trip finger 13 carried by a shaft 14. On shaft 14 is a lever arm 15 connected by a link 16 to a feed table 17. A spring 18 holds trip finger 13 in its normal position wherein it holds the clutch open. The feed table is pivoted on the frame of the machine and when it is depressed to feed a glued cover sheet into the machine, the trip finger is released and the clutch connects the driving pulley to the driving shaft. The driving shaft then makes one complete revolution after which the clutch is automatically thrown out and the shaft stopped, the table having in the meantime been released. During the first half of the turning of shaft 11, the feeding mechanism is operated and during the second half the feeding mechanism is stationary and the presser mechanisms are operated.

Four successive revolutions of shaft 11 are required to complete a cover and eject it from the machine. A cover sheet is fed in at the beginning of each revolution. This means that as one cover sheet is being fed in, a second cover and a third cover are being passed through the rollers and a fourth cover is being ejected.

The feeder and roller mechanisms are operated by a crank 19 on shaft 11 which is connected by a link 20 to a disk 21 fixed on a shaft 22. On disk 21 are pawls 23 which engage a ratchet wheel 24. Ratchet wheel 24 is fixed to a gear wheel 25 and both are loosely mounted to turn on shaft 22. Gear wheel 25 through gearing 26 drives a shaft 27 which forms the rear feed mechanism shaft. Spaced forwardly from shaft 27 is a front feed mechanism shaft 28. On shafts 27 and 28 are two pairs of sprockets 29 and 30 on which run endless chains 31. On chains 31 are spaced pins 32 for engagement with a cover sheet. Sprockets 29 are carried on splines 33 on shaft 27 so that while they turn with the shaft they may be adjusted along the shaft. The sprockets are held positioned by side bars 34 having fingers 35 at their ends which engage the opposite side faces of the sprockets. The side bars are connected at their central portions by a cross rod 36 having left and right hand threads and a knurled handle 37 at its one end. By turning the rod, the sprockets may be adjusted toward and away from each other by reason of the right and left hand threads, thus adjusting the distance apart of the endless chains.

On shaft 27 is a pair of middle rollers 38 which serve to assist in feeding the book cover to a pair of squeezing rollers 39 from whence the book cover is fed successively through pairs of squeezing rolls 40 and 41. The shafts of these rolls are geared together at their ends by gears 42 and all are driven by a chain 43 driven by a gear 44 on shaft 27.

With the described arrangement it will be seen that when connecting rod 20 moves toward the left as shown in Fig. 2, the pawl and ratchet mechanism will turn the gearing and feed mechanism but that when it moves toward the right the pawls will travel back around the ratchet wheel, the gearing and feed mechanism then being stationary. Thus on one half of each revolution of shaft 11 the gearing and feed mechanism is actuated while on the other half it is stationary. Shaft 22 has an oscillating movement, being turned first in one direction and then in the other as shaft 11 rotates. Fixed on shaft 22 is a wheel 45 connected by a belt 46 to a wheel 47 fixed on a shaft 48. On shaft 48 are gears 49 which engage racks 50 (see Figs. 1 and 14) of the cover board feed mechanism. Because of the oscillating movement of shaft 22, gears 49 are turned first in one direction and then in the other thus feeding racks forward during one half revolution of shaft 11 and back again during the other half revolution of shaft 11.

On shaft 11 are two segmental gears 51 adapted to engage with gears 52 on a shaft 53. Carried by shaft 53 are crank wheels 54 to which are connected the lower ends of connecting rods 55. The upper ends of connecting rods 55 are connected to the vertically movable portion of the folding and pressing mechanism, (see Figs. 1 and 3). During the back movement of connecting rod 20, gear segments 51 engage gear wheels 52 and impart one complete revolution to shaft 53 thus lowering the movable portion of the folding and pressing mechanism and raising it again. This movement takes place while the feeding mechanism is stationary. It will thus be seen that when shaft 11 makes one complete revolution, first the feeding mechanism is operated and then the folding and pressing mechanism.

Beyond the rolls 41 is a final presser mechanism comprising a vertically movable lower plate 56 carried by toggle levers 57 (Fig. 17) and an upper presser plate 58 supported on posts 59 which project upwardly from the frame of the machine, the plate being fastened yieldingly on the posts by springs 60. Posts 59 form guides for movable plate 56. Toggle levers 57 are connected by a rod 61 to an eccentric 62 on shaft 11. The arrangement is such that plate 56 is raised to perform its pressing function at the same time that the connecting rods 55 are moved to perform the pressing and folding operaion before described.

Beyond the final pressing mechanism is an ejector comprising two arms 63 which slide in guides 64 and have pivoted ejector pins 65 at their ends (Figs. 16 and 17), the pins being capable of turning toward the right (Fig. 17) but being held by stops from turning toward the left. Arms 63 are connected together by a rod 66 at the center of which is a link 67. Link 67 is connected by a cross rod 68 to the upper end of a lever 69 pivoted at its lower end on an ear 70 on the frame. Lever 69 is connected by a rod 71 to a cam 72 on shaft 11, the rod being provided with a roller 73 which runs in a groove in the cam. The arrangement is such that when plate 56 has moved away from plate 58 arms 63 are moved forward to bring pins 65 into engagement with a book cover and then moved back to pull it off the plate, dropping it onto a holder 74. It is desirable to stack the completed covers always with the outsides in engagement with each other and the glued or insides in engagement with each other so as to avoid getting glue on the outsides of the completed covers. To accomplish this, I provide means for turning over every other cover. This means comprises an arm 75 (Fig. 17) pivoted at its lower end on an ear 76 on the frame and provided with a sloping ledge 77 at its upper end. On lever 75 is a pin 78 which engages the edge of a cam 79 on a shaft 80, being held in engagement with the cam by a spring 80$^a$. On shaft 80 is a wheel 81 connected to a wheel 82 on shaft 11 by a belt 83, the ratio of the diameters of the wheels to each other being such that two revolutions of shaft 11 is required to effect one revolution of shaft 80. When arm 75 stands in the position shown in Fig. 17, a cover plate being pulled off plate 56 will strike the top of ledge 77 and will be turned to fall with the glued side down. When the next cover is ejected, arm 75 will have been moved back by cam 79 so such cover will fall with the glued side up.

From the foregoing description, it will be seen that all the mechanisms are driven from saft 11; that during the first half revolution of shaft 11 the feeding and ejecting mechanisms are operated, and that during the second half revolution the two pressing mechanisms are operated.

In connection with Fig. 2, and also in connection with other of the views, the details as to bearings for the shafts have been omitted to make the drawing clearer. It will be understood that suitable bearings are provided in the frame of the machine for the various shafts and other moving parts.

Forming a part of the frame of the machine and extending across it between the loops of chain 31 is a top plate 84 provided with stationary posts 85 on which slide the presser plate 86 to which rods 55 are connected. Plate 86 is shown diagrammatically in Fig. 1 and also the parts carried by it. Also, it is shown raised up above its true position so as to show the parts below. It is shown in its correct relative position in Figs. 3, 9 and 10. On plate 84 are end guides 87 in which slide transversely extending bars 88 having inturned ends 89 provided with openings 90. Bars 88 are held yieldingly against stops 91 by springs 92 which surround pins 93 connected to the bars, and lying between the heads of the pins and the stops. Bars 88 are thus mounted so they may move toward each other, sliding in guides 87. Supported on bars 88 are L-shaped folder bars 94 having pins 95 on their under sides which slide in holes in bars 88. Bars 94 are yieldingly supported by springs 97, and lie substantially flush with a plate 98 carried by two longitudinally extending strips 99 supported by posts 100 and held yieldingly by springs 101. It will be seen that plate 98 and strips 99 may be forced downward until posts 100 strike base plate 84 and that bars 94 may be forced downward until they strike bars 88.

Carried by the underside of presser plate 86 is a frame 102 (shown diagrammatically in Fig. 1) hung on studs 103 and held by springs 104 so it may have a yielding upward movement. Carried by frame 102 are two pairs of spaced holder bars 105 and 106, the supporting arms 107 for the bars being adjustable along the frame for different widths of cover boards. Midway between each pair of holder bars is a spring pressed ejector pin 108 and adjacent to each is a presser bar 109. The relative positions of these parts is best shown in Fig. 9. Holder bars 105 and 106 are of a length somewhat less than the distance between bars 94 so they may enter between them while presser bars 109 are long enough to strike on top of bars 94. Depending from each end of presser plate 86 are two arms 110 having beveled ends 111. The beveled ends are adapted to enter openings 90 to force the folding bars 94 toward each other when plate 86 is moved downward.

Extending longitudinally of the frame of the machine are two gauge frames 112 and 113 which are adjustable sideways for different sizes of covers. At their front ends they are provided with downwardly extending plates 114 to which are fastened spring plates 115 having inturned ends 116 (see Figs. 9 and 11). Midway between gauge frames 112 and 113 and extending parallel to them are two inside gauge strips 117 provided with spring plates 118 having inturned ends 119. Spring plates 115 and 118 are arranged in opposed relation to each other as best shown in Fig. 9 and their inturned ends form hooks or flanges which serve as the initial supports for the cover boards. Gauge strips 117 are threaded on two spaced rods 120 (see Fig. 15) and are pressed against a cone shaped spreader 121 by springs 122. By adjusting the head of cone shaped spreader up and down by means of the screw 123, strips 117 may be set the desired distance apart. The opposite ends of strips 117 are held parallel by a spreader 123ª pivoted at its center and located between the strips. A spring 124 fastened to an arm 125 on the pivot pin for spreader 123ª serves to turn the spreader, the spring being strong enough to move the ends of the strip and hold them parallel against the stacks of cover boards. This is best shown in Fig. 1 where A indicates one stack of cover boards, the other being omitted from the drawing.

To the rear of top plate 84 is a top plate 126 (see Figs. 1 and 14) provided with channels 127 in which racks 50 slide. Fastened to plate 126 are cross pieces 128 and vertical pins 129 which form positioning means for the two stacks of cover boards, the pins being carried by the cross pieces. The forward pins terminate just short of plate 126 so that a cover board may slip beneath them and the ends are provided with holes in which are arranged spring pressed balls 130. This arrangement serves to permit but one board to be fed forward at a time. The two stacks of cover boards rest on plate 126, one stack being above each channel 127. The forward end of each rack (Fig. 14) is bifurcated and the furcations have slots 131 in which is a pivot pin which carries a finger 132 having an upwardly projecting flange 133 adapted to engage the edge of a cover board. On the rack is a cam surface which slides under finger 132. When rack 50 moves forward, the cam surface slides under finger 132 raising it so that flange 133 will catch a cover board as shown in Fig. 14. When the rack starts back, the cam surface moves from under the finger permitting it to drop down and slide back under the stack. Finger 132 is arranged to offer sufficient resistance against movement that it must be pushed and pulled by the rack which means that the pivot pin for finger 132 is engaged by one end or the other of slot 131 depending on the direction of movement.

At the rear ends of bars 112 and 113 and adjacent to the ends of rolls 40 are end folding fixtures 134 which serve to fold over the end edges of the cover sheet as it passes from rollers 39 into rollers 40. The structure of the folder and its mode of operation is clear from an inspection of Fig. 20.

Carried by table 17 are rollers 135, one at each of its free corners, which are located over chains 31. The cover sheet is fed under these rollers and by them is pressed down onto the chain, causing pins 32 to penetrate the material of the cover. Rollers 135 may be adjusted in slots 136 to locate them in accordance with the adjustment of the chains. The corners of the table are cut out as is shown at 137 to accommodate the rollers.

In making a cover, it is important to turn a smooth even corner so to obtain a neat appearing fold. To accomplish this result, I provide at the ends of the folder bars 94 spring tuckers 138 which serve to press the cover sheet down over the edges of the cover boards. This is shown in detail in Fig. 13.

The details of the clutch mechanism are shown in Figs. 18 and 19. Pulley wheel 10 is carried by a sleeve 139 which is loose on shaft 11. On sleeve 139 is a collar 140 having a flange 141 in which are a series of spaced notches 142, four being shown in the present instance. Fixed on shaft 11 is a ring 143 which lies against collar 140 inside flange 141. It will be seen that when flange 141 is connected to ring 143, the pulley wheel will be connected to the shaft 11. For this purpose I provide a key 144 located in a notch in ring 143 and adapted to drop into one of the notches 142 in flange 141. The key 144 is held by a screw 145, the head of which is located in a recess in the key. A spring 146 acts to force key 144 outward, the distance it can move being limited by the head of the screw. Fastened to the frame of the machine is a guide 147 on which slides a cam plate 148 having a cam surface 149 adapted to engage key 144. In the corner of plate 148 is a notch with which trip finger 13 engages, the finger being pulled downward by a spring 150. Plate 148 is pushed toward the right (Fig. 18) by a spring 151 and is adapted to be moved toward the left by a lever arm 152 which engages a pin 153 projecting from the plate. Lever arm 152 is carried on one end of a shaft 154 pivoted in the frame piece 155 of the machine. On the other end of shaft 154 is a lever arm 156 adapted to be engaged by a cam 157 on shaft 11. When the parts are in the positions shown in Fig. 18, cam surface 149 holds key 144 flush with the periphery of ring 143 so that pulley wheel 10 turns freely without connection with the shaft. If now table 17 is depressed to feed a cover sheet into the machine, trip finger 13 is lifted releasing plate 148 which is then moved toward the right, Fig. 18, by spring 151. This moves cam surface 149 from beneath key 144 whereupon the key falls into a notch 142 thus connecting the pulley wheel to shaft 11. Shaft 11 now begins to turn. As soon as cam 157 reaches lever arm 156, the arm is depressed and turns lever arm 152 so as to return plate 148 to its left hand position where it is caught by trip finger 13, table 17 in the meantime having been released. Now as the shaft continues to turn, key 144 will be brought into engagement with cam surface 149 which will move the key upward out of the notch 142 and so open the clutch. It will thus be seen that when table 17 is depressed to feed a cover sheet into the machine, shaft 11 makes one complete revolution after which it is stopped automatically.

The operation is as follows. The operator places a cover sheet which has been previously glued on table 17 with the glued side up and with the forward edge under rollers 135, the cover sheet being lengthwise of the table. He then depresses the table thereby effecting actuation of clutch 12 and starting the machine. During the first half revolution of the driving shaft 11 the chains 31 are turned carrying the cover sheet into the machine and to a position over plate 98. At the same time the two racks 50 are fed forward pushing a cover board from beneath each pile onto the cover board supports formed by the inturned flanges 116 and 119. The operation of the board feed is clear from an inspection of Fig. 14. In Fig. 9 cover boards 2 are shown positioned on the flanges 116 and 119. The movement of chains 31 now ceases and during the second half revolution of shaft 11 and while the racks 50 are being returned, gear segments 51 turn shaft 53 one complete revolution, lowering and then raising the presser plate 86 and the parts carried by it. As the presser plate 86 moves downward, ejector pins 108 engage with the central portions of the cover boards, pushing them downward off flanges 116 and 119 and onto the cover sheet. Holder bars 105 and 106 then engage with the cover boards to hold them in position on the cover sheet and to depress the plate 98, bringing it down until the top faces of the cover boards are below the folder bars 94. This is shown in Fig. 11 where it will be seen that the plate 98 has been depressed. The depressing of the plate serves also to turn up the two side edges of the cover sheet as shown in Fig. 11, the cover sheet overlying the bars 94 by an amount to give the desired degree of turning of the cover sheet edges. The beveled ends 111 of arms 110 now enter openings 90, pulling bars 88 toward each other and thereby moving folder bars 94 over the edges of the cover boards. This is shown in Fig. 12 where it will be seen that the folder bars have moved from the position shown in Fig. 11 inward, at the same time turning the edge of the cover sheet down onto the edges of the cover boards. The presser bars 109 now engage with the tops of the bars 94, pushing the bars downward and squeezing tightly the turned in edges of the cover sheet. At the same time the tuckers 138 tuck the edges of the turned in portions down smoothly over the ends of the cover boards as is shown in Fig. 13. The presser plate 86 is then returned to its upper position. This completes one revolution of the shaft 11 and the machine stops as already described.

The operator then feeds another sheet into the machine, again depressing table 17 and causing shaft 11 to make another revolution. On this revolution the first fed in cover sheet and the cover boards thereon are carried into rolls 39. The feed of chains 31 then stops and a pressing operation takes place but at this time no operation is performed of the first cover structure. The rolls 38 form guide and supporting rolls for directing the cover structure into rolls 39. Now on the next rotation of shaft 11 the cover board structure is fed through squeeing rollers 40. During this movement the end edges of the cover sheet are turned in by the folding fixtures 134, the folding taking place just before the structure enters the rolls 40. Thus the end edges are turned in and pressed into place. The cover structure is carried forward through the rolls 41 and onto the lower presser plate 56. As shown, lower rolls 40 and 41 are connected by a wide belt for carrying the cover structure.

The pressure plate 56 is operated each second half revolution of shaft 11. On its next operation after the cover structure is carried onto it, the cover structure is given its final pressing, the presser plate 56 being raised by toggle levers 57 as already explained. Presser plate 56 may be a suitable embossing plate, being provided with a suitable pattern as shown in Fig. 16 for impressing on the cover board structure. Also it may be suitably heated by electricity or gas.

On the next operation of shaft 11, the completed cover board will be ejected from off plate 56 by the ejector arms 63. As the arms move in between the plates, fingers 65 will turn on their pivots, sliding over the cover board. At the end of the inward movement the fingers will drop down over the edge of the cover board and on the return movement of the arms the cover board structure will be pulled out from between the plates and dropped onto the holder 74, every other structure being turned over as already explained so that the glued sides are in contact with each other.

In connection with the cover sheet feed, it will be noted that the sheet is positively fed into the machine by the chain and that the pins on the chain engage the ends of the sheet throughout its width. This is of advantage because it insures that the cover sheet is fed into the machine straight and that the edges do not curl, the sheet being held straight and flat.

In setting up the machine originally, the side bars 112 and 113 and the gauge strips 117 are adjusted for the width of cover boards to be used, the side bars being suitably adjusted and fastened in place by bolts, one of which is shown at the right hand end of the bars in Fig. 1. These bars are lined up with the side edges of the cover boards and the pins 129$^a$ carried by them serve to hold the cover board stack straight. Also the right hand cross piece 128, Fig. 1, is adjusted the desired distance from the left hand cross piece 128 which is stationary. This serves to hold the stacks firmly in correct alignment. The use of the round pins 129 and 129$^a$ for positioning the stacks has the advantage that they offer little friction to movement of the boards and so assist in the reliable operation of the machine.

When side bars 112 and 113 are adjusted, the folding fixtures 134 which are carried by the bars are adjusted simultaneously therewith. I regard this arrangement as being one important feature of my construction as it insures that the folding fixtures are always correctly aligned with the cover boards. Also, it makes the adjustment of the structure a simple and easy matter.

Also, sprockets 29 and 30 are adjusted, collars 33$^a$ being loosened to permit sprockets 30, which turn on shaft 28, to move sidewise.

In connection with the pressing and side folding mechanism, it will be seen that first the cover boards are correctly positioned on their initial supporting means over the cover sheet and that the ejector pins 108 first press the cover boards down onto the cover sheet and hold them central after which they are firmly pressed and held by the holding bars 105 and 106. This insures that the cover boards are initially square on the cover sheet. Now when the plate 98 is pressed downward to the position shown in Fig. 11, the edges of the cover sheet are first evenly turned up along their entire length and then evenly turned over as is shown in Fig. 12. This results in a smooth even fold. After this fold is made, the same is then pressed in by the presser bars 109. By this series of operations improved results are obtained.

The machine is comparatively simple in structure and easy to operate, being semi-automatic. It can be built at low cost so that it may be used by the small bookbinder who could not afford an entirely automatic machine.

In accordance with the provisions of the patent statutes, I have described the principle of operation of my invention, together with the structure which I now consider to represent the best embodiment thereof, but I desire it to be understood that the apparatus shown is only illustrative and that the invention may be carried out by other means.

What I claim as new and desire to secure by Letters Patent of the United States, is:

1. In a book cover making machine, the combination of an endless carrier for conveying a cover sheet into the machine, said carrier having means for holding the cover sheet along opposed edges, means for positioning cover boards above said cover sheet, means for pressing said cover boards down onto the sheet and holding them positioned and for effecting folding in of the free edges while said first named edges are still held by said holding means, and folding means for said first named edges and squeezing rolls to which the cover structure is fed by said carrier after the folding of said free edges is effected.

2. In a book cover making machine, the combination of an endless carrier, means for imparting step-by-step movements to said carrier, pressing and folding mechanism, and means for actuating said pressing mechanism between step-by-step movements of the carrier, said pressing and folding mechanism comprising L-shaped bars between which the cover sheet and boards are first moved to turn up edges of said cover sheet, means for moving said L-shaped bars over edges of the cover board, and means for pressing said bars down on the cover boards.

3. In a book cover making machine, the combination of an endless carrier, pressing and folding mechanism to which the carrier delivers a cover sheet, and means for actuating said pressing and folding mechanism, said mechanism comprising L-shaped bars between which the cover sheet and boards are first moved to turn up edges of said cover sheet, means for moving said L-shaped bars over edges of the cover boards, means for pressing said bars down on the cover boards, and means for moving the cover sheet and boards away from the pressing mechanism, said L-shaped bars having tucking means for pressing the cover sheet down at edges of the cover boards.

4. In a book cover making machine, the combination of a yieldingly supported presser plate, L-shaped folding and pressing bars positioned along two edges of said plate, cover board supporting means located above said plate, means for positioning a cover sheet on said plate and cover boards on said supporting means, and movable means for first forcing said cover boards off said supporting means onto said cover sheet, then depressing said presser plate to turn up edges of the cover sheet, and then moving said bars to turn edges of said cover sheet over onto the cover boards.

5. In a book cover making machine, a movable table, means for feeding a cover sheet from the table into the machine, pressing and folding mechanism, a shaft for driving first the feeding means and then the pressing and folding mechanism, a clutch controlling the application of power to said shaft, means connected to the table for closing the clutch, and means for opening the clutch automatically after one operation of the feeding means and the pressing and folding mechanism.

6. In a book cover making machine, initial pressing and folding mechanism, squeezing rolls and final pressing mechanism, an endless carrier for conveying a cover sheet in two steps first to the pressing and folding mechanism and then to the squeezing rolls, and means for operating simultaneously both said mechanisms between said two steps.

7. In a book cover making machine, initial pressing and folding mechanism, squeezing rolls and final pressing mechanism, an endless carrier for conveying a cover sheet in two steps first to the pressing and folding mechanism and then to the squeezing rolls, means for operating both said mechanisms between said two steps, and means for stopping the machine automatically after each operation of said carrier and said mechanisms.

8. In a book cover making machine, the combination of means for forming covers including a final pressing mechanism, a holder, means for ejecting covers from said pressing mechanism onto the holder, and means for turning over every other cover.

9. In a book cover making machine, the combination of means for forming covers including a final pressing mechanism, a holder, ejector arms which move over the pressing mechanism for ejecting covers therefrom onto the holder, a ledge onto which every other cover falls for turning such cover, and means for moving the ledge into and out of operative position.

10. In a book cover making machine, the combination of a presser plate, means for positioning a cover sheet on said plate, means for initially supporting cover boards above said plate, side bars which extend longitudinally of the machine and carry said initial supporting means, means for adjusting said side bars relatively to each other and means carried by said side bars for turning over edges of the cover sheet onto the cover boards, whereby said supporting means and edge turning means are simultaneously adjusted and maintained in alignment.

11. In a book cover making machine, a feed table, supporting means for two stacks of cover boards, a folding and pressing mechanism located between the table and the supporting means, pressing rolls located beyond said mechanism, an endless carrier for moving a cover sheet from the table to the folding and pressing mechanism and thence to the pressing rolls, means for moving cover boards from the stacks to the folding and pressing mechanism, a final pressing mechanism to which a cover structure is fed from the pressing rolls, means for imparting step-by-step movements to the endless carrier, and means for operating said two mechanisms between step-by-step movements of the carrier.

12. In a book cover making machine, the combination of a presser plate, folding and pressing bars positioned along edges of said presser plate, means for positioning a cover sheet on said presser plate, cover board supporting hooks located above said presser plate, means for supporting cover boards adjacent to said presser plate, reciprocating means for transferring cover boards from said supporting means onto said supporting hooks, and downwardly movable means which first engages cover boards to force them off the hooks onto a cover sheet, then effects movements of said folding and pressing bars to fold over edges of the cover sheet, and then presses the bars downwardly to force the turned in edges of the cover sheet tightly onto the cover board.

13. In a book cover making machine, the combination of a presser plate, folding and pressing bars positioned along edges of said presser plate, cover board supporting means located above said presser plate, means for supporting cover boards adjacent to said presser plate, means for simultaneously positioning a cover sheet on said presser plate and cover boards on said cover board supporting means above the presser plate, and downwardly movable means which first engages the cover boards to force them off said supporting means onto the cover sheet, then effects movements of said folding and pressing bars to fold over edges of the cover sheet, and then presses the bars downwardly to force the turned in edges of the cover sheet tightly onto the cover boards.

14. In a book cover making machine, the combination of a presser plate, folding and pressing bars positioned along edges of said presser plate, cover board supporting means located above said presser plate, means for supporting stacks of cover boards adjacent to and above the plane of said supporting means, reciprocating means for transferring cover boards from the bottoms of said stacks to said supporting means, means for positioning a cover sheet on said presser plate, and downwardly movable means which first engages the cover boards to force them from said supporting means onto the cover sheet, then effects movements of said folding and pressing bars to fold over edges of the cover sheet, and then presses the bars downwardly to force the turned in edges of the cover sheet tightly onto the cover boards.

15. In a book cover making machine, a feed table, a first folding and pressing mechanism, cover board supporting means above said mechanism, a second folding and pressing mechanism beyond said first mechanism, an endless carrier for conveying cover sheets from the feed table to the first mechanism and then to the second mechanism, means for imparting successive movements to said carrier for conveying a cover sheet first to the first mechanism and then to the second mechanism, and means for positioning cover boards on said cover board supporting means upon each movement of said endless carrier.

16. In a book cover making machine, a feed table, an endless carrier for conveying cover sheets from the feed table into the machine, said carrier having means for holding the cover sheets along opposed edges, folding and pressing mechainsm for the longitudinal edges of the cover sheet, folding and pressing mechanism for the transverse edges of the cover sheet located beyond said first mechanism, means for imparting successive movements to said endless carrier for conveying cover sheets from the feed table to said first mechanism and then to the second mechanism, and means for positioning cover boards on said cover sheets at said first named folding and pressing mechanism.

17. In a book cover making machine, a feed table, an endless carrier for conveying cover sheets from the feed table into the machine, said carrier having means for holding the cover sheet along opposed edges, folding and pressing mechanism for the longitudinal edges of the cover sheet, folding and pressing mechanism for the transverse edges of the cover sheet located beyond said first mechanism, means for imparting successive movements to said endless carrier for conveying cover sheets from the feed table to said first mechanism and then to said second mechanism, cover board supporting means above said first named pressing and folding mechanism, means for positioning cover boards on said supporting means upon each movement of said endless carrier, means for operating said first named folding and pressing mechanism, and means for moving the cover boards off said supporting means onto the cover sheet prior to the operation of the first named folding and pressing mechanism.

18. In a book cover making machine, a feed table, an endless carrier comprising spaced bands having projecting pins for engaging opposed edges of a cover sheet, folding and pressing mechainsm for the free edges of the cover sheet, means for operating said mechainsm while the cover sheet is held on said pins, and folding and pressing mechanism for the opposed edges of the cover sheet to which it is conveyed by the endless carrier after the operation of said first named folding and pressing mechanism.

In witness whereof, I have hereunto set my hand.

ARNOLD KIRCHHOFER.